Figure 1:
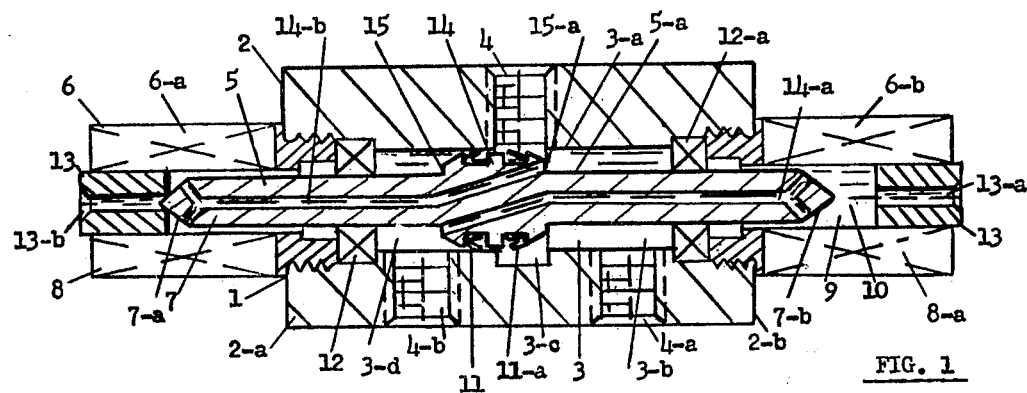

United States Patent [19]

Pauliukonis

[11] 4,320,782
[45] Mar. 23, 1982

[54] UNIVERSAL MOMENTARY CONTACT DIVERTER

[76] Inventor: Richard S. Pauliukonis, 6660 Greenbriar Dr., Cleveland, Ohio 44130

[21] Appl. No.: 181,006

[22] Filed: Aug. 22, 1980

Related U.S. Application Data

[63] Continuation-in-part of Ser. No. 9,678, Feb. 5, 1979, Pat. No. 4,231,399.

[51] Int. Cl.³ .............................................. F16K 31/06
[52] U.S. Cl. ........................... 137/625.65; 137/625.67; 137/625.68
[58] Field of Search ........... 137/625.27, 625.4, 625.43, 137/625.5, 625.64, 625.65, 625.68

[56] References Cited

U.S. PATENT DOCUMENTS

| | | | |
|---|---|---|---|
| 2,638,122 | 5/1953 | Ludwig | 137/625.65 |
| 2,916,019 | 12/1959 | Murphy | 137/625.65 |
| 2,983,285 | 5/1961 | Gardner | 137/625.65 |
| 3,384,122 | 5/1968 | Harpman | 137/625.64 |
| 3,951,166 | 4/1976 | Whitener | 137/625.27 |

FOREIGN PATENT DOCUMENTS 1550632  1/1970  Fed. Rep. of Germany ....................... 137/625.65

Primary Examiner—Robert G. Nilson
Attorney, Agent, or Firm—Richard S. Pauliukonis

[57] ABSTRACT

Universal momentary contact diverter valve is operated directly by axially disposed solenoid operators at each end of an elongated valve housing having a bore passing therethrough to receive a valving spool therein in an operable relationship with said solenoid operators so as to enable spool shifting directly to result in diversion of fluid flow passing therethrough and fluid exhaust therefrom via passages incorporated therein, energization of operator coils electrically accomplished momentarily by an application of voltage-overcharge-pulse to yield higher than conventional magnetic force.

10 Claims, 2 Drawing Figures

U.S. Patent  Mar. 23, 1982  4,320,782

UNIVERSAL MOMENTARY CONTACT DIVERTER

This is a Continuation-In-Part of my copending application Ser. No. 009,678 filed Feb. 5, 1979, now allowed to issue as a U.S. Pat. No. 4,231,399.

This application relates to momentary contact solenoid operated diverter valves in general, and to a simplified momentary contact diverter valve that is operated directly by a solenoid operator in particular, characterized by valve operation wherein an electric pulse, not exceeding 30 miliseconds in duration, causes position change of a spool resulting in flow redirection by such valves be it liquid or gas, universaly.

Internally piloted momentary contact reversing diverter, disclosed in the parent invention identified above, describes characteristics novel to the state of the art in valving. Although, because of the pilot pressure force internally piloted valves entail, such valves have no practical limits as to the system pressures or drag forces they can serve, the fact remains that there are too numerous application prohibiting the use of piloted designs due to many reasons, such as hazardous fluids that can not be exhausted from the solenoid cavity safely, and/or that there is only marginal pressure in the system such valves serve, or that the system is not conducive to the use of piloted valves, to name a few of such reasons.

It was determined, however, that the internally piloted fluid passages inside valve spool of the parent invention can serve well as fluid exhaust means in valves operated directly by solenoids of the present invention, thereby simplifying such valves. Further, it was established experimentally that cutting off fluid exiting a port, by a piston of a spool includes a sizeable fluid force, which force is purely depedent on pressures of the fluid valved, coupled with configuration and size of the passage fluid is flowing through before being cut-off. Unless the spool is internally piloted to permit fluid force aid in spool shifting while crossing central fluid supply port, large in size, often feeding a narrow slot offering reduced stroke for spool shifting inside valve while maintaining large fluid flow capacity, pilotless direct solenoid operated spool shifting must first consider the availability of a magnetic force solenoid coils can provide directly to the spool ends, for a similar action the plungers of the internally piloted(parent)reversing diverter operated, in order to insure proper valve operation. In final analysis, it was deduced that a direct operated momentary contact diverter valve can be designed so that the spool can be shifted by a magnetic force solenoid coils provide without any consideration to the pressure cut-off forces fluid produces. This was possible by the use of two seals for control of flow redirection and diversion of pressurized fluid from entrance port in lieu of a single seal shown in the parent diverter performing fluid cut-off when spool is shifted, thereby departing away from the original diverter design in-part. Further, by selecting solenoid coils with lower electrical resistance as measured by Ohms, additional gain materialized in that the coils with lower resistance were momentarily voltage overcharged for higher magnetic pull force without overheating, departing substantially from the conventional practice wherein coils must be sized in accordance with service type, to prevent burn-out. The object of the present invention is, therefore, to provide a direct solenoid operated simple diverter valve with spool ends of valving means acting as solenoid plungers capable of magnetic shifting for flow redirection through the valve, for universal use.

Another object of this invention is to provide a novel momentary contact valve which is simple to manufacture, assembly and maintain, and in particular to operate with practically negligible power requirement electrically in new applications universally. In this connection, the valve of present invention consists of basically two components, namely a valve housing with a single bore passing therethrough and a simple valve spool slidably received therein, plus two end solenoid operators secured at each opposite housing ends by threads for momentary energization electrically resulting in instant spool position change when one of the solenoid coils exerts larger than conventionally accepted magnetic pull force due to voltage overcharge pulse of a very brief duration over one of spool ends provided with magnetic material, to serve pressures and fluid flows therewith of considerably larger magnitude than those attainable by conventional valves, thereby greatly improving the state of the art in solenoid valves in general and in momentary contact solenoid valves in particular, since there are no direct operated solenoid valves of momentary contact with such capabilities in existance, in particular-with exhaust passages inside stem of the spool. These and other objects and advantages of the invention will become more fully apparent from the following description of an embodiment of the invention, taken together with the accompanying drawings.

IN THE DRAWINGS

FIG. 1 is a cross sectional view of a 3-ported direct solenoid operated momentary contact valve showing basic components such as valve housing, valving spool & operators.

Figure 2:
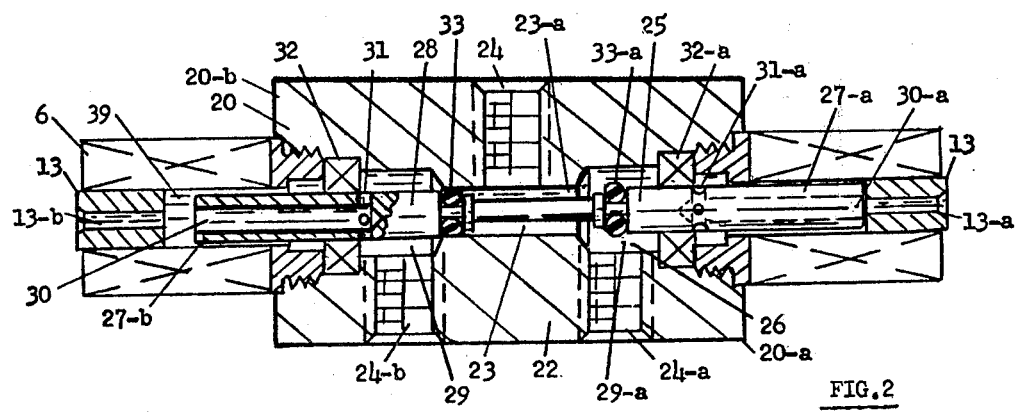

FIG. 2 identifies another version of 3-ported diverter with dual seals and integral fluid passages inside spool ends leading to fluid exhaust via passages inside solenoid stops, otherwise the same as that shown in FIG. 1.

Shown in FIG. 1 is an assembly of a momentary contact diverter 1 operated directly by a pair of solenoid operators 6. An elongated valve housing 2 is shown to have a bore 3 passing therethrough including fluid port 4 entering bore 3 perpendicularly through a wall, along with ports 4-a and 4-b spaced a short distance away therefrom. A slidably movable valving spool 5 with stem 7 inside housing bore 3 having ends 7-a and 7-b protrude housing ends 2-a and 2-b respectively into the solenoid cavities 9 comprising in effect an extension of bore 3 is in an operable relationship with solenoids 6, wherein when a first solenoid coil 8 of a first solenoid operator 6-a is electrically energized by a surge of voltage overcharge for a short period in miliseconds, preferably below 30 miliseconds, to result in a large magnetic pull force over first spool end 7a capable of attracting spool 5 to and maintaining in the position shown in FIG. 1-left, the second spool end 7-b inside cavity 9 of a second solenoid operator 6-b forms an end gap 10 between a stop 13 and end 7-b shown in FIG. 1, while when a second solenoid coil 8-a of a second solenoid operator 6-b becomes electrically energized momentarily, the reversal takes place and the valving spool becomes shifted by the magnetic pull force surrounding a second extreme spool end 7-b to the right, to have a second identical end gap formed in the opposite cavity of solenoid operator 6-a (not shown), and vice versa, wherein a brief energization of either of solenoid coils electrically provides powerful means of spool position change inside bore 3, accomplishing change in flow direction through the valve be it 2-ported valve wherein a third port shown in FIG. 1 is blocked or tree ported valve as illustrated therein, without further use of electrical power between the momentary energization periods which normally constitute a short pulse service, adaptable for higher voltage applications to conventional coils without the fear of overheating them.

A piston 14 with stem ends 7 of spool 5 is shown to have seals 11 and 11-a permanently secured therein and movable along with spool 5 during diverter operation so as to permit port 4, entering bore 3 substantially in the middle of housing 2, to alternatingly communicate with ports 4-a and 4-b, spaced a short distance apart toward housing ends and sealed by a pair of stationary seals 12 and 12-a inside counterbores of housing ends 2-a and 2-b respectively. Port 4 is shown to have a flow recess 3-c of a diameter slightly larger than the diameter of bore 3 but of narrow width. And when spool 5 is in a first location shown left in FIG. 1, fluid entering port 4 is directed to port 4a via annulus 3-b, formed between bore portion 3a and reduced diameter spool section 5-a, protected by stationary seal 12-a and movable piston seal 11 engaged inside bore 3 adjacent port 4-b while seal 11-a is disengaged therefrom inside recess 3-c. Flow between ports 4 and 4-b is prohibited until spool 5 is shifted to the right when coil 8a is energized.

When spool 5 is shifted from the position shown in FIG. 1, seal 11-a will block-off port 4-a allowing fluid communication to proceed from port 4 to port 4-b via annulus 3-d, and vice versa. Alternatingly, seals 11 and 11a will engage bore 3 on sides of flow recess 3c. Port 4 in reality is not subjected to a cut-off by a single seal shown and claimed to perform flow diversion function in the parent application. Instead, when seal 11 engages, seal 11-a disengages simultaneously without upsetting continuity of flow. No drastic fluid forces develop during flow reversals by this diverter since present design employs two seals to control direction of fluid entering and leaving valve proper. This type of sealing pemits control of large pressures without undue requirement for larger magnetic forces for spool shifting. Also, flows are considerably larger through the valve using dual seals. Ergo, smaller and less costly solenoid coils can be used here.

Further, spool of this invention can be provided with integral fluid passages which can be of overlapping arrangement as shown in FIG. 1 or they can be drilled inside spool ends to serve as flow exhaust means shown in FIG. 2.

In FIG. 1 flow passages 14-a inside spool 5 initiate on piston side 15 while flow passages 14-b inside spool 5 initiate on piston side 15-a to proceed in an overlapping arrangement so as to exhaust via flow passages at spool ends 7-b and 7-a respectively into the solenoid cavities 9 to exhaust into the open via exhaust ports 13-a and 13-b of solenoid stops 13 respectively, depending on the position spool is allowed to assume axially inside bore 3. Shown in FIG. 1 is spool position wherein exhaust port 13-b is blocked off by the taper of spool end 7-a allowing receiver port 4-b to exhaust via spool pilot port 14-a and exhaust port 13-a while receiver port 4-a is in communication with fluid supply port 4 which position is, incidentally, maintained driftless by the fluid action over piston 14 shown of diameter larger than the spool ends until the solenoid coil 8-a is energized momentarily to change spool position diverting fluid flow through the valve, and vice versa. Obviously, valves shown in FIG. 1 and FIG. 2 can be used for flow reversal between ports 1, 2 and 3 without utilization of exhaust ports, which are optional. Optional fluid passages 14-a and 14-b inside spool 5 are intended to serve system requirements calling for fluid exhaust only. Otherwise, diverter of FIG. 1 may be provided with either tapered spool ends if such diverters serve in direct current applications, such as battery actuated field irrigation systems, or they may have flat spool ends as that shown in FIG. 2. Likewise, having seals 12 and 12-a fixed inside respective housing ends 2-a and 2-b while spool ends 7-a and 7-b respectively slide on inside seal diameters, less friction is generated by the seals during spool shifting axially. Finally, since seals 11 and 11-a travel axially very little, and since seals 12 and 12-a are detacheable, valve manufacture and assembly, as well as maintenance are reduced to the bare minimum.

Obviously, if port 4 is designated to be fluid supply port, ports 4-a and 4-b then become fluid receiver and exhaust port means alternatingly communicating with supply port 4 when valving spool 5 is shifted between solenoid operators 6-a and 6-b, consistent with operation of typical diverters or reversing valves used in solar heating, air-conditioning/heat pump systems, process or automation control. However, port 4 may equally become a receiver port in systems requiring mixing of two fluids supplied via ports 4-a and/or 4-b alternatingly, or individually. In such cases diverter becomes a mixer valve of momentary contact, direct solenoid operated design, requiring consideration of supply pressures, because often fluids to be mixed are subject to presure variation which may develop large end forces over sides of piston 14 of FIG. 1. Such forces may require large solenoid operators, and may render such diverter valves limited in applications, unless piston of FIG. 1 is modified to a spool piston of that shown in FIG. 2 eliminating large diameteral variations in spool, detrimental to high pressure applications.

Shown in FIG. 2 identifying simple diverter valve for universal use, operated by identical solenoid operators 6 is an elongated valve housing 20 with a bore 23 passing therethrough including fluid ports 24, 24-a and 24-b entering bore 23 perpendicularly through a wall 22, and a slidably movable valving spool 25 with ends 27-a and 27-b protruding housing ends 20-a and 20-b respectively into solenoid cavities 39 comprising essentially extension of bore 23 to permit an operable relationship between solenoids 6 and spool 25, in an identical fashion diverter of FIG. 1 operated.

The difference in spools 5 of FIG. 1 and 25 of FIG. 2 requires slight modification of housing bore 23 of FIG. 2 in that if the diveters are to serve identical fluid flow, bore 23 may have diameter identical to bore 3, at least in the center section 23-a with port 24 while bore sections 29 and 29-a that serve ports 24-b and 24-a respectively may have slightly larger diameters adjacent stationary seals 32 and 32a respectively, forming a fluid annulus 26 between a stem 28 of spool 25 at ends 27-a and 27-b, as shown in FIG. 2, including fluid exhaust passages 30 and 30-a inside spool ends 27-b and 27-a respectively, and a plurality of radial exhaust holes 31, clearly visible in cross-sectioned spool end 27-b as well as inside spool end 27-a at 31-a adjacent seal 32-a. Note that when spool is in position shown in FIG. 2, port 24-b is open to exhaust via holes 31 and exhaust passage 30 of spool end 27-b, and exhaust port 13-b of the solenoid stop 13, while the exhaust means at the opposite spool end 27-a are disconnected from annulus 26 until spool 25 is shifted to change position inside bore 23 (not shown) allowing port 24-a to exhaust via holes 31-a facing annulus 26 in communication with exhaust passages 30-a and 13-a, and vice versa. The spool seals 33 and 33-a during spool position change, alternatingly enter bore section 23-a to either permit fluid communication between ports 24-a or 24-b regardless of provisions of optional exhaust spool ends may have.

Design modification identified in FIG. 2 may, indeed, serve many applicational needs universally, except for very large flows which may preferably be handled more easily by the design shown in FIG. 1, if pressures are low, since holes 31 and 31-a of spool 25 of FIG. 2 may be limited to the stroke which, in direct solenoid operated valves, is controlled by the magnetic forces solenoid coils can develop, limiting their capacity.

Like in FIG. 1, seals 33 and 33-a of FIG. 2 generate little frictional resistance, rendering diverter ideally suited for substantially large number of applications with high system pressures, unlike the design modification depicted in FIG. 1 with large piston.

It must be noted that spools of FIG. 1 and FIG. 2 must be produced either from iron or magnetic materials known as ferritic, including stainless steels from ferritic group 400 series such as 410 or 430 stainless if they are made as solid one piece spools, or if they are produced from other materials in order to satisfy specific requirements calling for wetted surfaces of the spool to be made from plastics or other non-ferritic materials such as aluminum, spool ends that enter operator cavities must be ferritic in order to insure spool shifting by a magnetic force solenoid coils generate when energized electrically. Likewise, spool ends may be increased in diameter above that of dual seals considerably more than shown in FIG. 2, to insure driftless spool position selected.

Other changes eliminating or adding certain specific structural or procedural details may be made in the above described diverter without departing from the invention.

What is claimed is:

1. An universal momentary contact diverter comprising:
    an elongated valve housing with a bore passing therethrough between first and second housing ends each closed by an identical electrical solenoid operator having solenoid cavities thereof forming an extension of said bore,
    including a fluid supply, receiver and exhaust port means incorporated in said housing with a first port entering said bore perpendicularly through a housing wall substantially midway between said housing ends while each second and third housing ports enter said bore perpendicularly and are spaced a short distance away from said first port along the length of said housing toward said first and seconds ends thereof, and
    an axially movable elongated valve spool placed inside said housing bore so as to have spool ends protruding from said housing ends and entering said solenoid cavities in an operable relationship therebetween for shifting said spool magnetically therein between a first position when a first solenoid coil of a first solenoid operator is momentarily energized by an electric pulse pulling a first spool end towards a first stop thereof to allow said first port to communicate freely with said second port while said third port is disconnected, and
    a second position when a second solenoid coil of a second solenoid operator is momentarily energized by an electric pulse pulling a second spool end into a direction opposite the first direction towards a second stop thereof to allow said first port to communicate freely with said third port while said second port is disconnected, and vice versa,
    including a set of two movable seals permanently secured on said spool substantially central thereto at equal distance therebetween adjacent said first port, and a set of two stationary seals inside the ends of said bore of said housing adjacent said operators.

2. An universal diverter as in claim 1 wherein said bore includes a radial flow recess inside said bore in communication with said first port of a diameter slightly larger than the diameter of said bore to facilitate flow passages around one of said movable seals while another of said movable seals is firmly engaged inside said bore, and when said spool is in said first position, a first movable seal is seated inside a first side of said recess inside said bore while a second movable seal is disengaged in the vicinity of said recess allowing fluid communication between said first and second ports until said spool is shifted to change position therein, and when said spool is in said second position, said second movable seal is seated inside a second side of said recess inside said bore while said first movable seal is disengaged in the vicinity of said recess allowing fluid communication between said first and third ports.

3. An universal diverter as in claim 2, wherein said elongated valve spool includes a narrow central piston of a diameter slightly smaller than the diameter of said bore to facilitate a sliding fit therebetween and adaptable of receiving said movable seals secured therein at each piston side, including a stem thereof of reduced diameter at each piston side long enough to insure that stem ends comprising said first and said second spool ends protruding said housing ends do enter said solenoid cavities without diametral interference therebetween to facilitate spool shifting magnetically.

4. An universal diverter as in claim 1, wherein said bore includes bore sections of different diameters, and a first central bore section with said first port having a diameter that provides sealing interference for said set of movable seals but is less than the diameters of the adjoining bore sections provided with said second and third ports respectively which are seal non-interfering but smaller than the diameters of counterbores that house stationary seals at said housing ends, and
    when said spool is in said first position, a second movable seal inside said spool is seated inside a second side of said central bore section adjacent said third port for sealing off fluid communication between said third and first ports while allowing fluid communication between said first and second ports via an annulus formed between a first adjoining bore section of larger diameter and said second spool end provided with a first movable seal which is disengaged from a first side of said central bore section adjacent said second port until said spool is shifted to assume a second position when said second operator is energized momentarily by said electric pulse disengaging said second movable seal while engaging said first movable seal in said first central bore section for flow redirection, and vice versa.

5. An universal diverter as in claim 1 wherein said first and second stop inside said solenoid cavities is provided with exhaust port means, and said spool receives passages for fluid exhaust incorporated integrally into the valving spool to insure discharge of the fluid alternatingly from said third port when said spool is in said first position and also from said second port when said spool is shifted into the second position, and when said spool is in said first position, said first and second ports are in communication while said third port is to exhaust via said solenoid cavity provided with a first exhaust port means inside a first stop, until spool position changes to have fluid communication between said first and third ports while said second port is to exhaust via said solenoid cavity provided with a second exhaust port means inside a second stop, and vice versa.

6. An universal diverter as in claim 5 wherein said fluid exhaust passages in said spool include a bore entering said spool ends partway identical distance so as to exit peripherally therefrom via a first set of exhaust holes drilled adjacent a first stationary seal into a second solenoid cavity when said spool is in said first position and a second spool end is abutting said second stop while said first spool end forms a gap between said first stop for exhaust of said third port therethrough via a second set of exhaust holes drilled adjacent a second stationary seal facing said third port when said spool is in said first position until said spool is shifted to permit exhaust of said second port via said first set of holes, and vice versa.

7. An universal diverter as in claim 5 wherein said fluid exhaust passages integral to said spool are of overlapping interrelationship and said spool ends are tapered.

8. A momentary contact diverter valve as in claim 1 wherein said bore includes a central bore portion of smaller diameter than the rest of the bore length but not smaller than the diameter of said solenoid operator cavity controlling outside diameter of said spool for less costly manufacture thereof if said spool is produced from solid stock in one piece.

9. A momentary contact diverter as in claim 1 wherein said spool is made from ferritic material including stainless steel 400 group such as 410 or 430 stainless.

10. A momentary contact diverter as in claim 1 wherein said spool ends are ferritic, including diameter slightly larger than the diameter of said dual spool seals, allowing composite spool assembly wherein wetted portion thereof is compatible with fluids valved.

* * * * *